US 9,151,861 B2

(12) United States Patent
LaBrecque (10) Patent No.: US 9,151,861 B2
(45) Date of Patent: Oct. 6, 2015

(54) METHOD AND APPARATUS FOR MEASURING THE ELECTRICAL IMPEDANCE PROPERTIES OF GEOLOGICAL FORMATIONS USING MULTIPLE SIMULTANEOUS CURRENT SOURCES

(75) Inventor: Douglas John LaBrecque, Sparks, NV (US)

(73) Assignee: MULTI-PHASE TECHNOLOGIES, LLC, Sparks, NV (US)

( * ) Notice: Subject to any disclaimer, the term of this patent is extended or adjusted under 35 U.S.C. 154(b) by 309 days.

(21) Appl. No.: 13/409,482

(22) Filed: Mar. 1, 2012

(65) Prior Publication Data
US 2012/0223717 A1 Sep. 6, 2012

Related U.S. Application Data

(60) Provisional application No. 61/448,512, filed on Mar. 2, 2011.

(51) Int. Cl.
*G01V 3/02* (2006.01)

(52) U.S. Cl.
CPC .......................................... *G01V 3/02* (2013.01)

(58) Field of Classification Search
None
See application file for complete search history.

(56) References Cited

U.S. PATENT DOCUMENTS

| | | | |
|---|---|---|---|
| 4,875,015 A | 10/1989 | Ward | |
| 5,740,036 A * | 4/1998 | Ahuja et al. | 702/17 |
| 5,835,054 A * | 11/1998 | Warhus et al. | 342/22 |
| 5,955,884 A * | 9/1999 | Payton et al. | 324/339 |
| 6,295,512 B1 | 9/2001 | Bryant | |
| 6,404,203 B1 * | 6/2002 | Lagmanson | 324/362 |
| 6,658,567 B1 * | 12/2003 | Barton et al. | 713/193 |
| 6,670,813 B2 | 12/2003 | Strack | |
| 6,804,625 B1 | 10/2004 | Bryant | |
| 7,003,400 B2 | 2/2006 | Bryant | |
| 7,023,213 B2 | 4/2006 | Nichols | |
| 7,034,539 B2 | 4/2006 | Ueda et al. | |
| 7,117,093 B2 | 10/2006 | Stinson et al. | |
| 7,124,028 B2 | 10/2006 | Ray et al. | |
| RE39,844 E | 9/2007 | Srnka | |
| 7,340,348 B2 | 3/2008 | Strack | |
| RE40,321 E | 5/2008 | Srnka | |
| 7,386,402 B2 | 6/2008 | Bryant | |
| 7,567,084 B2 * | 7/2009 | Eidesmo et al. | 324/334 |
| 7,705,599 B2 * | 4/2010 | Strack et al. | 324/348 |
| 7,739,049 B2 | 6/2010 | Market et al. | |
| 7,773,457 B2 | 8/2010 | Crice et al. | |
| 7,805,249 B2 | 9/2010 | Summerfield et al. | |
| 2006/0132137 A1 * | 6/2006 | MacGregor et al. | 324/334 |
| 2007/0299632 A1 | 12/2007 | Bryant | |
| 2008/0042653 A1 | 2/2008 | Bryant | |

(Continued)

FOREIGN PATENT DOCUMENTS

WO 9429752 12/1994

*Primary Examiner* — Jermele M Hollington
(74) *Attorney, Agent, or Firm* — Schwabe, Williamson & Wyatt, P.C.

(57) ABSTRACT

A system for measuring geological data is disclosed. The system includes several transceivers distributed over a geographical area. Each of the transceivers has at least one transmitter and at least one receiver. The transceivers are in communication with each other. The receivers are adapted to measure at least one electrical signal. The transmitters are adapted to inject an electrical current into a subsurface area. The transmitters operate simultaneously to inject the electrical current into the subsurface area simultaneously from a number of locations.

14 Claims, 9 Drawing Sheets

(56) References Cited

U.S. PATENT DOCUMENTS

2008/0300658 A1* 12/2008 Meskens .................. 607/60
2009/0015262 A1* 1/2009 Strack et al. ................ 324/348
2009/0121720 A1 5/2009 Wahrmund et al.
2009/0230970 A1 9/2009 Ziolkowski
2010/0001713 A1* 1/2010 Royle ........................ 324/67
2010/0018718 A1 1/2010 Krebs et al.
2010/0194396 A1 8/2010 Bryant
2010/0299070 A1 11/2010 Abma

* cited by examiner

METHOD AND APPARATUS FOR MEASURING THE ELECTRICAL IMPEDANCE PROPERTIES OF GEOLOGICAL FORMATIONS USING MULTIPLE SIMULTANEOUS CURRENT SOURCES

CROSS REFERENCE TO RELATED APPLICATIONS

This application claims priority to U.S. provisional patent application Ser. No. 61/448,512, filed Mar. 2, 2011. The entire contents of which are herein incorporated by reference.

FIELD OF THE INVENTION

This invention relates to measuring subsurface electrical properties in order to obtain geological information and more particularly to using a distributed system of low-power transceivers to perform large scale geological surveys.

BACKGROUND

Several techniques and methods have been used to measure subsurface electrical properties in order to obtain geological information about underground structures. There are three closely related electrical geophysical techniques (EGT); electrical resistivity tomography (ERT), electrical impedance tomography (EIT) and controlled source electromagnetics (CSEM). These techniques seek to determine subsurface electrical properties and operate at audio or sub audio frequencies.

Measurements are made by inducing current flow through a pair of electrodes and simultaneously monitoring induced voltages in additional pairs of electrodes and their connecting wires. The electrodes are formed from metal or graphite placed either directly in the ground or placed inside a porous container containing a salt solution which in turn is placed in the ground. Because of the simple, robust nature of the electrodes, EGT systems are amenable to either characterization mode where single surveys are made to locate subsurface features, or as a monitoring tool where the electrodes are permanently placed and the technique is used to monitor the changes in the subsurface over time.

The primary differences between the techniques are in the interpretation methods applied to the resulting data. The ERT technique assumes that the electrical potential can be accurately approximated using a steady-state approximation based on Laplace's equation. The EIT technique assumes that the intrinsic properties are frequency dependent but that the electrical potential can still be approximated using a complex Laplace's equation. The CSEM method requires a full solution to Maxwell's electromagnetic equations.

These methods provide tools for imaging subsurface electrical resistivity distributions. Because of this imaging capability, they can also be used for inferring fluid flow and transport. They can be applied to a range of depths, well spacings, and reservoir types, and could be used to monitor oil field stimulation applications, such as water and steam flooding. Anything that changes the electrical resistivity of the subsurface area can be monitored. Because electric current flows through the pore fluid of an underground reservoir, electrical methods are especially sensitive to pore fluid content and have been applied to mineral exploration, environmental, oil field and industrial projects.

U.S. Pat. No. 7,805,249 purports to disclose a method for performing a controlled source electromagnetic survey of a subterranean region. U.S. Pat. No. 7,773,457 purports to disclose a wireless exploration seismic system that acquires seismic data using a data acquisition module that collects seismic data and forwards the data to a central recording and control system. U.S. Pat. No. 7,386,402 purports to disclose an apparatus for transmitting and detecting geophysical data using reconfigurable control units.

SUMMARY OF ONE EMBODIMENT OF THE INVENTION

Brief Description of One Embodiment of the Present Invention

In one embodiment, the present invention comprises a system for measuring geological data. The system includes a plurality of transceivers with each of the transceivers having at least one transmitter and at least one receiver. The transceivers are in communication with each other. The receivers are adapted to measure at least one electrical signal. The transmitters are adapted to simultaneously inject an electrical current into a subsurface area.

In another embodiment, the present invention comprises a method of measuring electrical properties of a geological formation. The method includes deploying an array of transceivers over a geographical area. Each of the transceivers has at least one transmitter and at least one receiver. Current is transmitted simultaneously into the geological formation from the array of transceivers. Several electrical signals are sensed and the electrical signals are processed into a set of processed data. The set of processed data is transmitted.

In an additional embodiment, the present invention comprises a system for measuring geological data. The system includes means for simultaneously transmitting an electrical current into a geological formation through a plurality of electrodes and means for sensing a plurality of electrical signals resulting from the electrical current. The apparatus also has means for recording the electrical signals and means for processing the electrical signals into a set of data. Means for transmitting the set of data are also included.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

Advantages of One or More Embodiments of the Present Invention

The various embodiments of the present invention may, but do not necessarily, achieve one or more of the following advantages:

The ability to provide an apparatus for measuring geological data with improved resolution and superior signal to noise ratios;

The ability to provide a modular system of transceiver devices that can collect data as a standalone unit or can be configured into an array;

The ability to provide an array of transceiver devices that can inject electrical current from multiple transmitters simultaneously through multiple electrodes into the ground;

A system of distributed transceivers with the ability to transmit current simultaneously from a number of transceiver locations;

The ability to provide flexibility in the transmission and sensing of array patterns;

The ability to collect and process data in multiple waveform modes;

The ability to provide a geological measurement system containing multiple transmitters each capable of transmitting precisely controlled waveforms and multiple transceivers that can transmit simultaneously;

The ability to provide a transceiver apparatus that can communicate with each other through either a wired, fiber optic, or wireless radio frequency or infrared interface; and.

These and other advantages may be realized by reference to the remaining portions of the specification, claims, and abstract.

DESCRIPTION OF CERTAIN EMBODIMENTS
OF THE PRESENT INVENTION

In the following detailed description of the embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
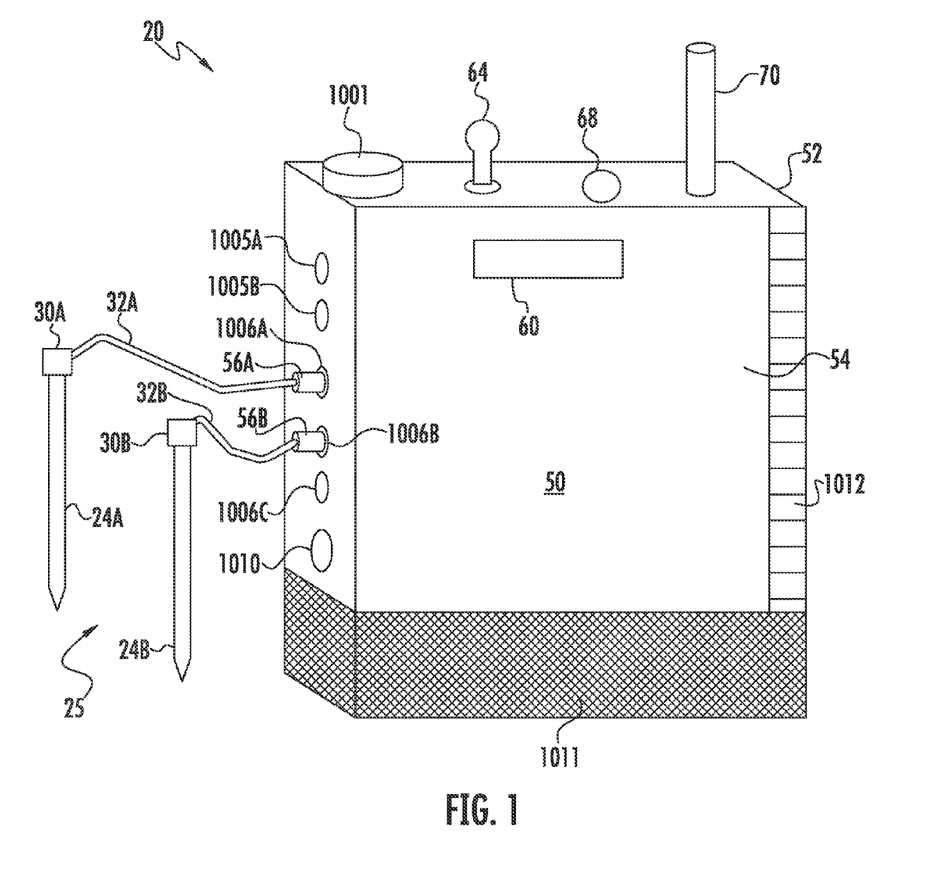
FIG. 1 is substantially a perspective view of a transceiver apparatus or unit in accordance with the present invention.

FIG. 1 illustrates an individual transceiver apparatus, device or unit 20. Transceiver 20 comprises a GPS antenna 1001, keyed switch 68, communication antenna 70, status display 60, link input terminals or connectors 1005A and 1005B, output terminals or connectors 1006A, 1006B and 1006C, removable battery unit 1011 and transmitter heat sink 1012. In one embodiment, the transceiver 20 is connected via a male connector portion 56A and cable 32A to an electrode 24A through a connector 30A. Transceiver 20 is also connected to a second electrode 24B via connectors 30B and cable 32B and male connector portion 56B. The electrodes 24A, 24B are composed of electrically conductive material such as metal, graphite, carbon composite or metal filled composite. The electrode can be rod shaped to be inserted into the ground or flat plates placed on the surface of the ground. Electrodes 24A and 24B can form a dipole 25. In this embodiment, the cables 32A, 32B are stranded copper wire with a plastic insulated sheathing and soldered, braised, clamped, or glued to the electrodes 24A, 24B using a conductive polymer. Transceiver apparatus 20 can be operated completely independently or can be linked together to form an array or grid of transceiver apparatuses. If operated independently, transceiver apparatus 20 may be programmed to transmit electrical signals and/or measure electrical signals at a predetermined time or during predetermined time intervals.

Power and control unit 50 can include a housing 52 that contains the electronic components that form transceiver apparatus 20. Housing 52 has several sides 54 that form the outer surface of housing 52. Male connector portions 56A and 56B can be received by output connectors 1006A and 1006B and can mate with cables 32A and 32B. Input connectors 1005A-B and output connectors 1006A-C can be mounted to one side 54.

An antenna 70 can be used to create a wireless link between several transceiver apparatuses 20 or a remote computer 150 (FIG. 2) used for control and downloading data. Alternatively, connector 1010 can be used to connect an external terminal or computer to the unit to send a series of pre-programmed command or to retrieve data. A display 60 such as a liquid crystal display (LCD) can be mounted to one side 54. Display 60 can display operating parameters such as battery voltage and temperature A power switch 64 is mounted to housing 52 and can be used to turn power on and off to transceiver apparatus 20. In one embodiment, the switch is rotary type with a removable key that can be removed to prevent the unit from being turned on or off accidentally. An indicator light 68 may be included with transceiver apparatus 20 in order to indicate various operating parameters or convey other information to a user. For example, if transceiver apparatus 20 experiences a fault, indicator light 68 may be flashed.

Figure 2:
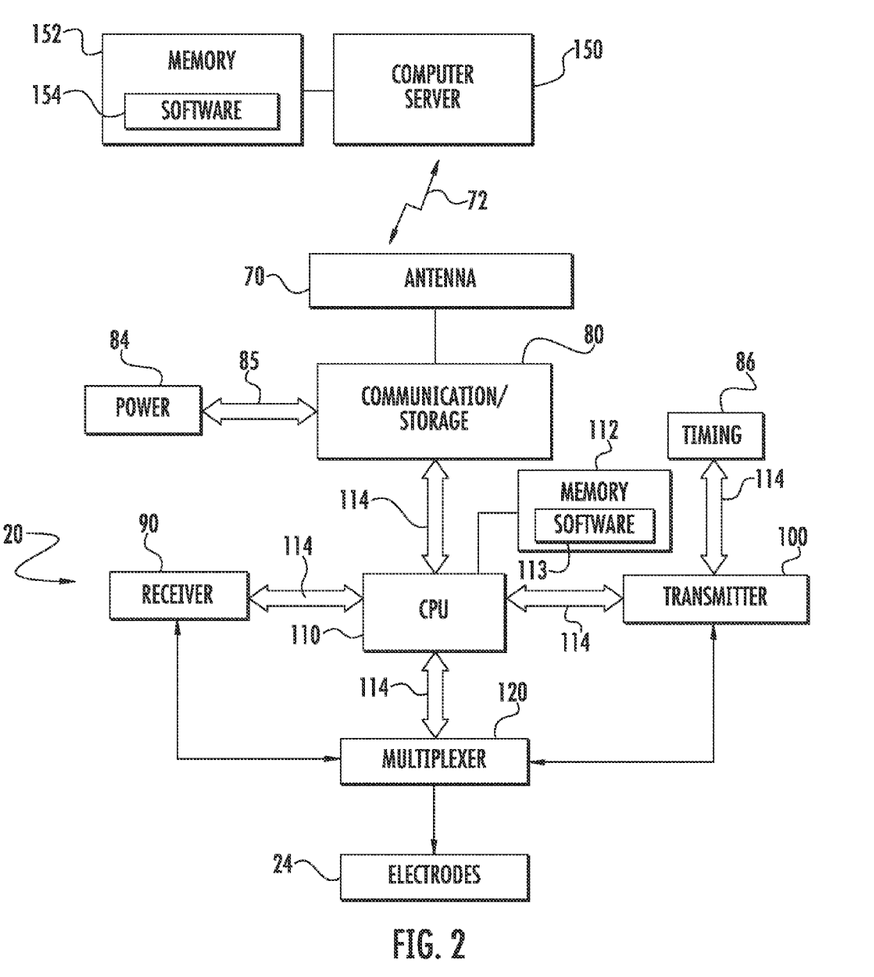
FIG. 2 is substantially a schematic diagram of the components of the transceiver of FIG. 1.

With reference to FIG. 2, further details of transceiver apparatus 20 are shown. Transceiver apparatus 20 comprises a communications/storage module 80, a central processor unit 110, a timing module 86, a transmitter 100, a power source or unit 84, a receiver module 90 that monitors electrical potential, a multiplexer module 120, electrodes 24 and computer server 150.

Communication/storage module 80 can be a low power wireless module such as the Digimesh™ system that allows peer-to-peer communication between multiple wireless modules or with a computer server. The Digimesh™ system is commercially available from Digi Corporation of Minnetonka, Minn. Communication/storage module 80 can provide wireless communications and control the system power. Communication/storage module 80 is connected with antenna 70. Communication/storage module 80 can wirelessly communicate with computer server 150 or with other transceiver apparatuses 20 using a wireless signal 72 in order to exchange data, instructions and operating parameters.

Communication/storage module 80 can send and receive wireless communication signals 72. Communication/storage module 80 can use a wide variety of communication protocols and systems and can include, but is not limited to PCS, GSM, TDMA, CDMA, Internet Protocol (IP) network, Wireless Application Protocol (WAP) network, a WiFi network, bluetooth or a local area network (LAN). In another embodiment, communication/storage module 80 may be a wireless module, a direct wire link (for example Ethernet or RS485), a fiber optic link, or an infrared link. In one embodiment, communications/storage module 80 can be a data storage device. In this embodiment, each data storage device would collect data according to a set of commands stored on the data storage device. After the data collection is completed, data would be retrieved from individual transceivers.

Communication/storage module 80 allows each transceiver apparatus 20 to communicate at distances of a few hundred meters even in an urban environment. Communications can travel or hop from one transceiver apparatus 20 to another transceiver apparatus 20 and to others allowing communications over several kilometers in urban environments and tens of kilometers in rural environments. The communication rate can slow down if the data is required to travel through a large number of transceiver apparatuses 20.

The central processor unit (CPU) 110 can be a low-power microprocessor that is commercially available. CPU 110 can be in communication with communication/storage module 80, receiver 90, transmitter 86 and multiplexer 120 through a data bus 114. CPU 110 can contain a machine readable medium or memory unit 112. Memory unit 112 may be internal to CPU 110 or may be external memory such as flash memory, ROM, RAM or a hard drive unit. CPU 110 is connected to memory unit 112. Software instructions and programs 113 may be stored in memory unit 112 for execution on CPU 110 in order to control the operation of transceiver apparatus 20.

The machine-readable medium 112 on which is stored one or more sets of instructions such as software programs 113 can that include any one or more of the methodologies or functions described herein. The software 113 may also reside, completely or at least partially, within the CPU 110. Software 113 may also reside or be transmitted from computer server 150. The software 113 may include data objects and applications that can be transmitted or received over to or from computer server 150 via wireless signal 72.

Computer server 150 can also include a machine readable medium or memory unit 152 that contains software programs or instructions 154. Memory unit 152 is connected to computer server 150. Software 154 can be transmitted from computer server 150 to CPU 110 and memory unit 112.

While the machine-readable medium 112 is shown in an example embodiment to be a single medium, the term, "machine-readable medium", should be taken to include a single medium or multiple medium such as a centralized or distributed database, and/or associated caches and servers that store one or more sets of instructions. The term, "machine-readable medium", shall also be taken to include any medium that is capable of storing, encoding or carrying a set of instructions for execution by the machine and that cause the machine to perform any one or more of the methodologies shown in the various embodiments of the present invention. The term, "machine-readable medium", shall accordingly be taken to include, but not be limited to, solid-state memories, optical and magnetic media, and carrier wave signals.

To compensate for potentially slow communications, the CPU 110 can perform most of the data processing, and can perform a series of pre-scheduled tasks so that computer server 150 needs only to download schedule and timing information to each transceiver apparatus 20 rather than detailed control information. Computer server 150 can also upload processed data from transceiver apparatuses 20 as opposed to uploading raw unprocessed data. By programming CPU 110 to process data at each transceiver apparatus 20, the need for rapid communications and high data throughput rates is reduced.

Power source or module 84 can be any suitable source of power. For example, power source 84 can be a high discharge battery and a power controller that distributes power to the various components transceiver apparatus 20 through a power bus 85. In other embodiments, power source 84 can be solar panels or a connection to an external power source or a combination of these power sources.

The system timing unit 86 provides a common time reference to all transceiver apparatuses. The system timing unit 86 can be an embedded global positioning system (GPS) module. System timing unit 86 is in communication with transmitter 100 through data bus 114. In an additional embodiment, system timing unit 86 can be a high precision crystal clock or a timing signal sent from a central unit either through a direct wire link or a radio frequency link.

Transmitter 100 can inject a current through dipole 25 including one or more of electrodes 24A, 24B into the ground. Transmitter 100 is in communication with CPU 110 through data bus 114 and is also connected to multiplexer 120. Receiver 90 is in communication with CPU 110 through data bus 114 and is also connected to multiplexer 120.

While transceiver apparatus 20 was shown with one receiver 90 and one transmitter 100, more or fewer receivers and transmitters can be included within transceiver apparatus 20. In an embodiment, transceiver apparatus 20 may include only receivers or only transmitters. In another embodiment, some transceiver apparatuses 20 may have multiple transmitters. In one embodiment, some transceiver apparatuses 20 may have multiple receivers.

Multiplexer 120 can be a 3×4 multiplexer that allows several receivers 90 and transmitters 100 to be interconnected with electrodes 24 and for communication signals to be routed from one transceiver to the next transceiver. Electrodes 24A and 24B are connected to multiplexer 120. The electronic components that form transceiver apparatus 20 can be connected, packaged and manufactured using conventional electronic assembly techniques such as printed circuit boards, cables, connectors and surface mount assembly techniques.

A number of transceiver apparatuses 20 can be deployed over a geographical area in an array configuration. The array may have a regular order such as in a grid or may have a more random orientation. Computer server 150 can control an entire system of deployed transceiver apparatuses 20. Computer server 150 can have a wireless or internet connection that allows real-time monitoring of the system configuration and uploading and imaging of the data from other remote locations.

Software 113 and 154 can be programmed to verify the configuration of the system of deployed transceiver apparatuses 20. This can be done using timing or GPS unit 86 in the system. The connections between transceivers apparatus 20 can also be tested and confirmed automatically. To do this, the impedance is monitored in one transceiver while the interconnections are enabled and disabled in adjoining transceivers using multiplexer 120.

Figure 3:
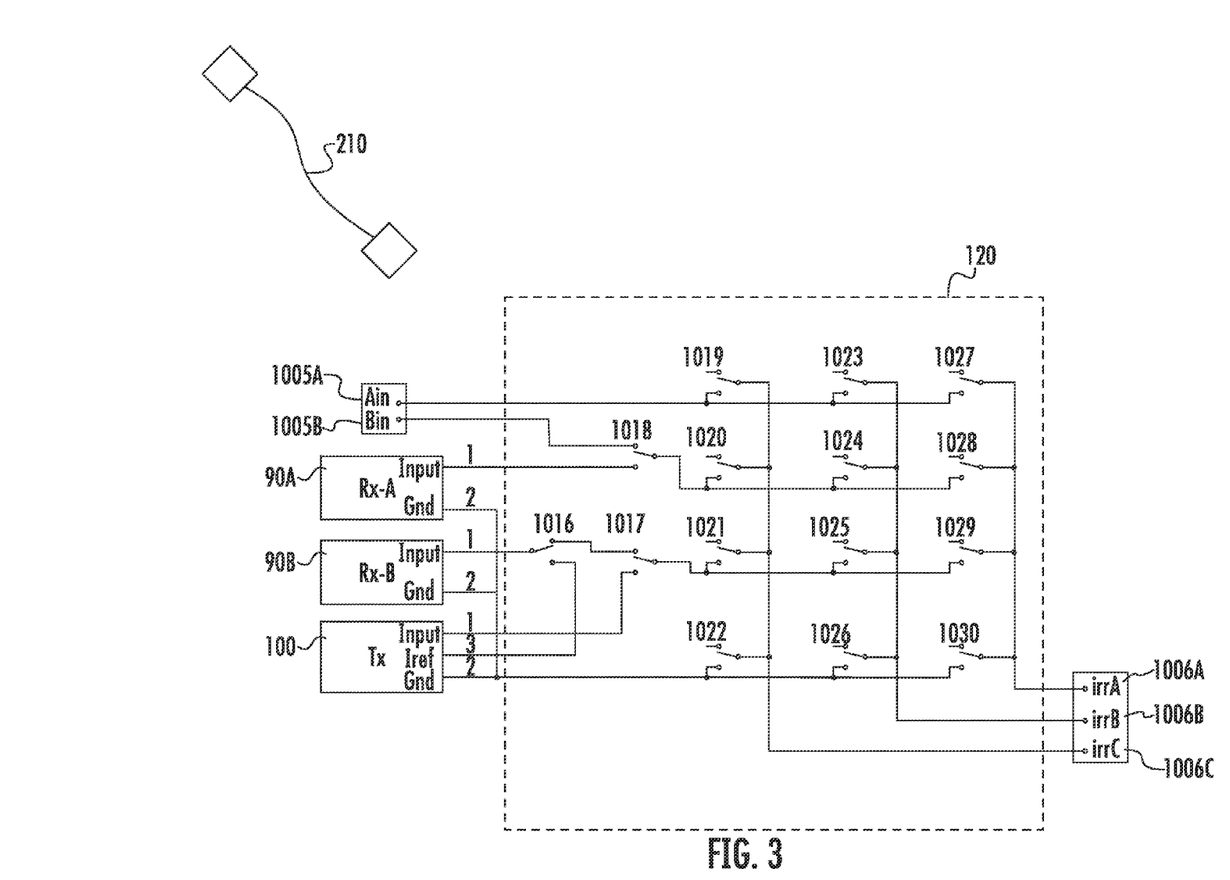
FIG. 3 is substantially a more detailed schematic diagram of a portion of the transceiver of FIG. 2.

Turning now to FIG. 3, additional details of transceiver 20 including receiver 90, transmitter 100 and multiplexer 120 are shown. In this embodiment, the receiver 90 can further comprise two receiver channels 90A, and 90B that allow for the collection of two measurements at the same time or simultaneously. Each receiver 90A and 90B has a separate input terminal Input and a ground terminal Gnd shared with the other receiver and transmitter. Transmitter 100 has a terminal Iref used to monitor current flow across a precision resistor that is internal to transmitter 100, an output terminal Output and a ground terminal Gnd. The connector 1005 of one transceiver can be connected to the output connector 1006 of another transceiver 20 to allow communication signals or electrical connections to be routed from one transceiver 20 to the next. The connector 1005 is connected to the output connector 1006 of other transceivers 20 using a cable 210.

In the embodiment of FIG. 3, the multiplexer 120 contains 15 controlled switches, 1016 through 1030. Switches 1016-1030 can be latching or non-latching mechanical or optical relays or relay modules and are controlled by the system microprocessor. Two of the switches, 1016 and 1017 work in tandem to switch the transceiver 20 from transmit mode to receiver mode. In FIG. 3, both switch 1016 and 1017 are shown in the receiver position. In this position the transmitter output is disconnected and the receiver 90B is connected to the 3×4 multiplexer 120. By closing the appropriate switches, the input and ground leads of the receiver 90B can be connected to any of the three connectors 1006A, 1006B and 1006C. Connectors 1006A-1006C may be connected to one or more electrodes 24 or to the input of another transceiver 20.

When the transceiver 20 is operating in transmit mode, both switches 1016 and 1017 are switched to the alternate position. The transmit mode, allows the transmitter 100 to be connected to any of the output connectors 1006A-C. Switch 1018 enables or disables the second receiver channel 90A. Alternately, switch 1018 enables or disables a connection to input connector 1005.

In the position shown in FIG. 3, the receiver 90A channel is disabled and the connection to input connector 1005 is enabled. Enabling input connector 1005 allows another transceiver apparatus 20 to be connected to any of the 3 outputs connectors 1006A-C. Connector 1005A is connected to the 3×4 multiplexer 120 that allows electrical potential or electrical current from another transceiver 20 to be coupled or routed to any of the terminals of the output connector 1006A-C.

Each receiver 90A, and 90B can include a twenty-four bit analog to digital converter. When transmitter 100 is transmitting, one of the receivers' 90B can monitor the current flow. Transmitter 100 can control its own current flow with about twenty bits of precision. Therefore, monitoring current using the receiver twenty-four bit analog-to-digital converter provides better accuracy and a better method of calibrating the transmitter output.

Multiplexer 120 can be connected with receivers' 90A and 90B, transmitter 100 and one or more electrodes 24.

Multiplexer 120 can provide a flexible interconnection between multiple transceiver apparatuses 20. Multiplexer 120 can connect or link together several different transceiver apparatuses 20.

Figure 4:
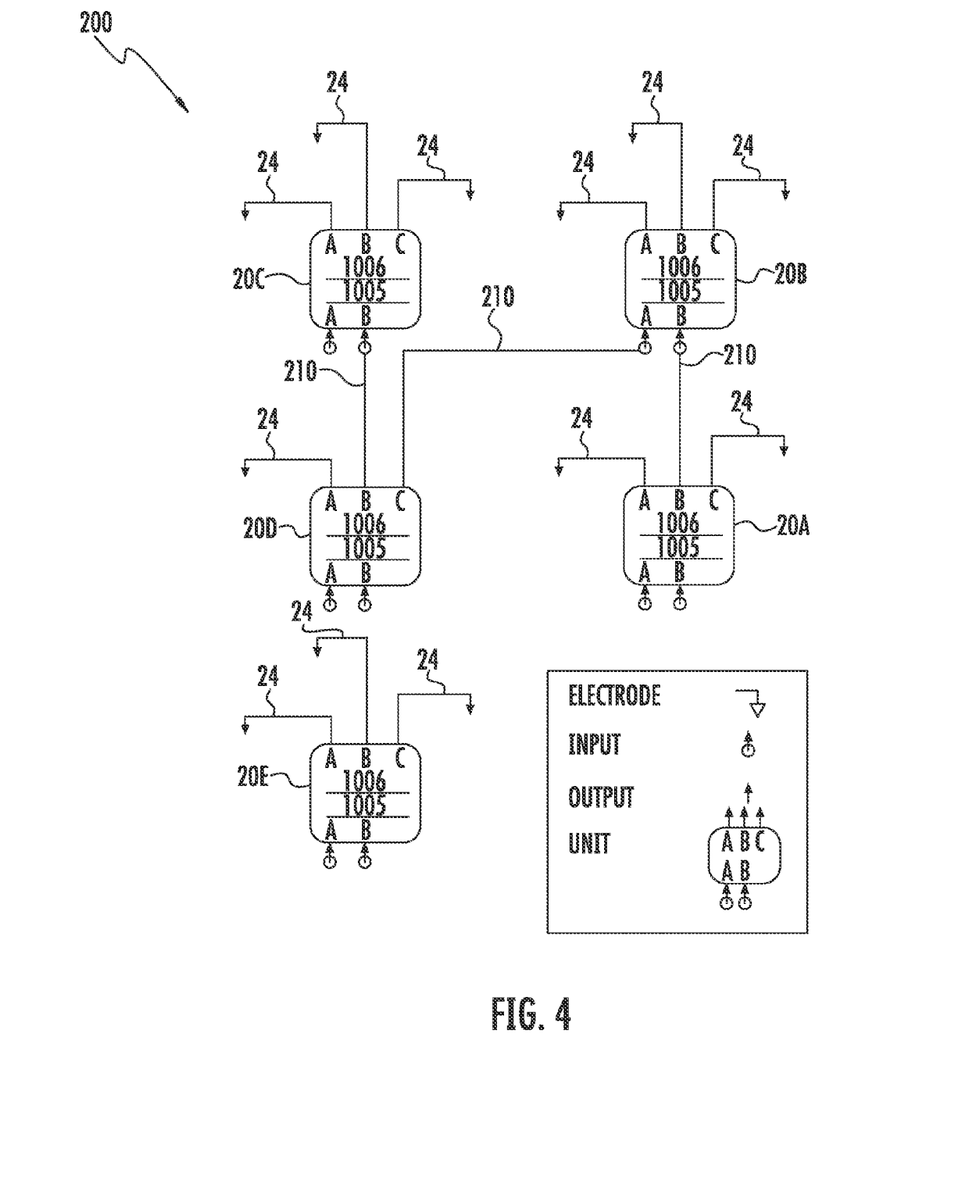
FIG. 4 is substantially a diagram of an array of linked transceivers.

FIG. 4 illustrates several transceiver apparatuses 20 linked together or operating cooperatively to form a transceiver system or array 200. Transceiver array 200 can be deployed in a grid formation over a geological area. Alternatively, transceiver array 200 can be arranged in a line or in a linear manner. Transceiver array 200 comprises transceiver apparatuses 20A, 20B, 20C, 20D and 20E. Each individual transceiver apparatus 20 can communicate with another transceiver apparatus 20 either through the use of multiplexer 120 and electrical cables 210 or wirelessly using communication/storage module 80. In FIG. 4, transceiver apparatus 20E is shown operating independently.

With linked transceivers 20A to 20D, the ground electrode 24 for one transceiver can be used as the remote electrode 24 for the linked transceiver, or the signal can be passed on to the next remote electrode 24 or linked transceiver. The present invention provides an enormous amount of flexibility in the transmission and sensing of array patterns. FIG. 4 shows an example of linked transceivers. Each transceiver can link to one (20A, 20C) or more (20B, 20D) transceivers or can function as a stand-alone transceiver (20E).

Transceiver array 200 can be arranged over a geographical area and such that current is transmitted simultaneously from a number of transceiver locations. Transceiver array 200 can be used to collect audio or sub audio frequency electrical geophysical data. The data can be collected either under direct user control or autonomously by following a set of pre-assigned configuration commands. The geophysical data can be interpreted and analyzed using a multi-dimensional data inversion and interpretation program. Geophysical data from transceiver array 200 can be transmitted to computer server 150 (FIG. 2). Computer server 150 can perform calculations and analysis to provide two or three-dimensional images of subsurface electrical impedance properties.

In an embodiment, the data from several receivers may also be combined to make a single data point by taking a weighted average of the data from each individual receiver.

Figure 5:
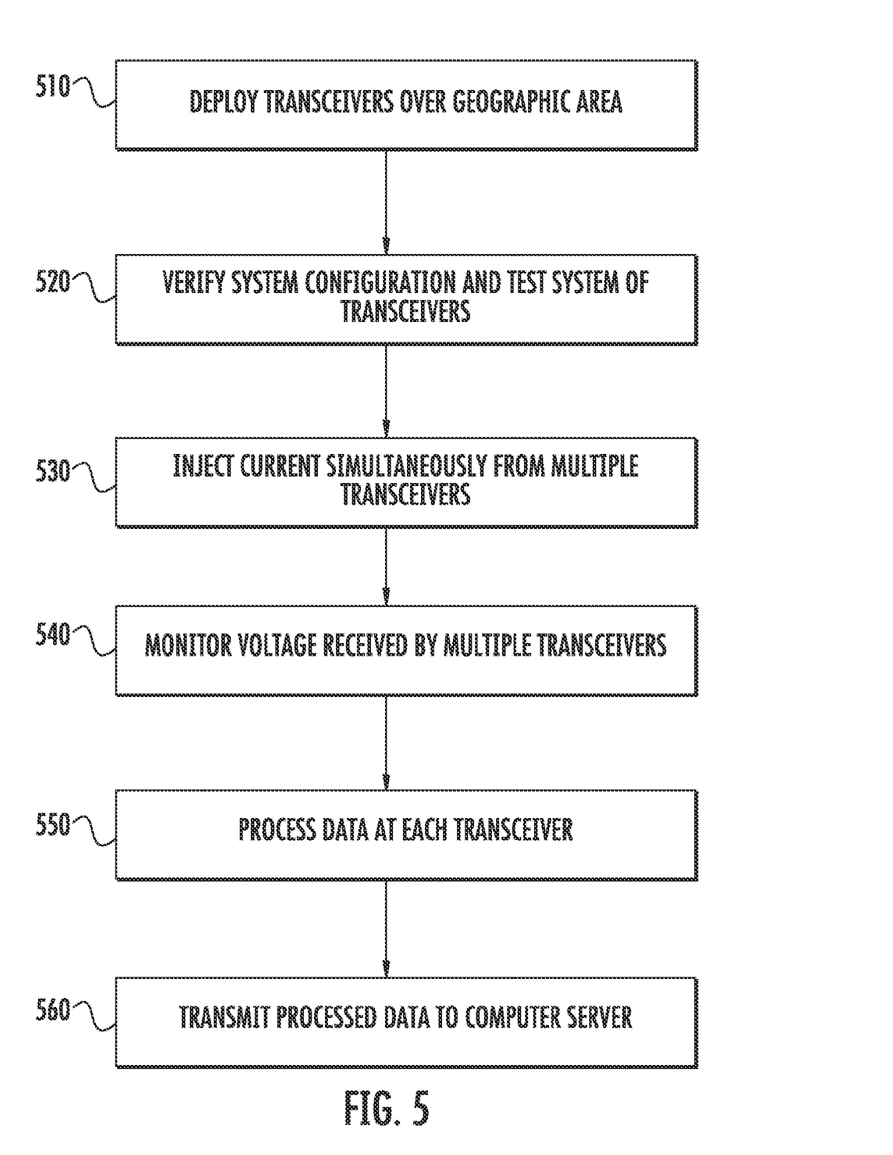
FIG. 5 is substantially a flowchart of a method of measuring the electrical impedance properties of a geological formation using an array of transceivers in accordance with the present invention.

Referring to FIG. 5, a flowchart of a method of measuring the electrical impedance properties of a geological formation using an array of transceivers is shown. Method 500 includes deploying transceiver array 200 (FIG. 4) over a geographical area for which the subsurface features are desired to be measured in step 510. At step 520, the system configuration of the transceivers is verified and tested. Step 520 may include transmitting instructions and parameters from computer server 150 (FIG. 2) and computer server 150 receiving data about the settings of each transceiver. Current is injected simultaneously from the transmitters in transceiver array 200 into the geological formation at step 530. For example, transceivers 20A-20D of FIG. 4 can simultaneously inject current into a geological formation. At step 540, one or more receivers in each transceiver can monitor or sense and record the resulting electrical signals or voltage levels received by the receivers. In FIG. 4, transceiver 20E can be the receiver. The data or dataset generated from the sensed electrical signals can be initially processed by CPU 110 (FIG. 2) within each transceiver at step 550. The processing can include performing initial calculations on the data received. The processed data is transmitted to the computer server in step 560.

Transmitting of low-frequency electric current requires two electrodes, one current source and one current sink; this pair of electrodes is referred to as a dipole. For this invention both electrodes can be connected to a single transceiver or one electrode can be connected to one transceiver and the second electrode to a remote transceiver that is connected to the first transceiver. In one embodiment of the current invention the current flow and received potentials can be routed through several transceivers to create a continuous, complete signal.

Transceiver array 200 allows the use of a multi-source transmitter method, which is the ability to inject electrical current from multiple transmitters simultaneously into a geological formation. This allows a number of low power transceivers to achieve the signal-to-noise levels comparable to systems with a single, massive, high power transmitter and to have superior resolution to prior art systems. The present invention is able to collect data ranging from environmental sites with surveys at scales of a few meters to carbon dioxide sequestration sites with scales of several kilometers.

Progressing from small-scale to increasingly large scale geological surveys causes the signal levels to decrease and noise levels tend to increase. Several ways are known to compensate for this problem. Remote reference noise reduction methods can help reduce noise levels. Other methods of dealing with these problems are increased amounts of signal averaging, and increasing the current flow from the transmitter. Both of these methods of improving signal-to-noise problems are limited by square-power relations. For example, using signal averaging to decrease noise effects by a factor of two typically requires a factor of a four times increase in the number of averages. Therefore, the data acquisition time also increases by a factor of four.

Doubling the current flow of a transmitter requires quadrupling the transmitted power because to double the current, the voltage must also be doubled. However, most of the transmitted power is dissipated a short distance from the transmitting electrodes. Therefore, by transmitting current into the ground simultaneously using several source dipoles using transceiver array 200 and spacing the electrodes an appropriate distance, the signal strength will increase proportionally to the number of transmitters. Transceiver array 200 can inject as much current into the ground using ten 500 watt transmitters as a single 50 Kilowatt transmitter.

Figure 6:
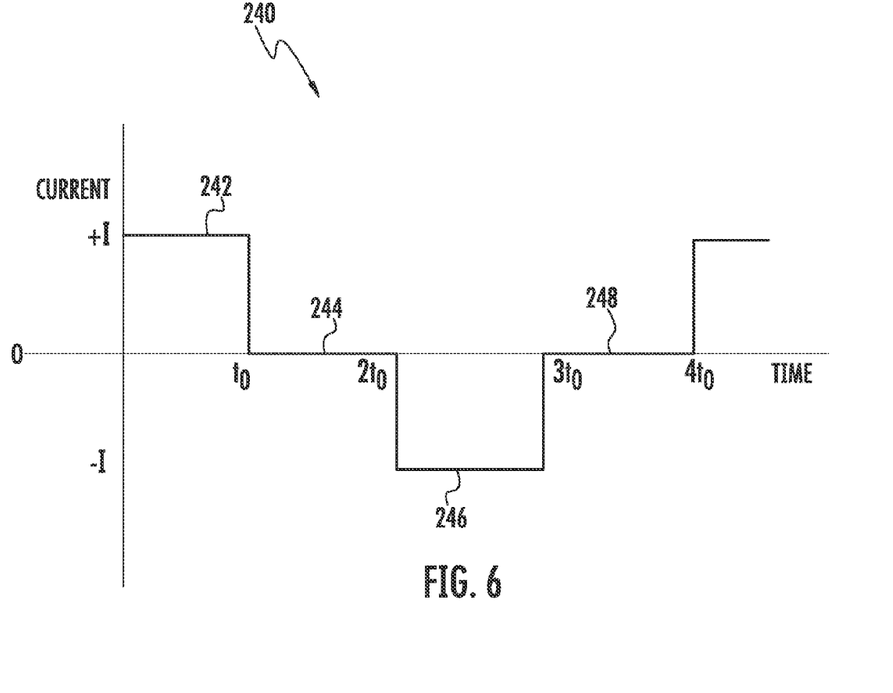
FIG. 6 is substantially a graph of current versus time illustrating the waveform used for time-domain induced polarization or electromagnetic measurements in accordance with the present invention.

FIG. 6, illustrates a time-domain waveform 240 that can be generated by transmitter 100 (FIG. 2) and provided to electrode 24 (FIG. 4) in order to inject a current into a subsurface geological formation. The time-domain waveform can be a 50% duty cycle square wave. The transmitter outputs a positive current 242 for time $t_0$. The current 244 is turned off for the same length of time between $t_0$-$2t_0$ and then a reverse polarity current 246 is transmitted during the time period $2t_0$-$3t_0$. The current 248 is turned off for a second time period from $3t_0$ to $4t_0$. This cycle of current injection can be repeated several times and the results averaged. The time period for $t_0$ may vary from a few milliseconds to a few tens of seconds. The length of the time periods can be the same or may be different. In one embodiment, the time periods can all be the same.

The transmitters in transceiver array 200 can transmit simultaneously at the same time. The shape of the transmitted waveform and timing can be the same from all of the different transmitters. In an embodiment, the waveform can be at the same frequency and start and end at the same time. In another embodiment, the amplitude of the waveform may be different at each transmitter but would be tightly controlled to a pre-assigned value.

In one embodiment, the transmitters in transceiver array 200 can transmit waveforms for current injection with the same shape and frequency but with different amplitudes. For low frequency electromagnetic measurements, the transmitted waveforms may also be phase shifted. The transmitted waves can be one of four types: a time domain waveform as shown in FIG. 6, a frequency domain waveform with either a sine wave or a square wave, a finite pulse designed to allow frequency domain data to be collected at two or more frequencies simultaneously or a pseudo-random waveform.

Plots of computer simulated subsurface sensitivity can be performed to illustrate the improved ability of the present invention to measure changes in subsurface electrical properties. In three-dimensional geophysical data imaging routines, the subsurface in and adjacent to a survey area is divided into a series of rectangular parallelepiped regions referred to as voxels. The sensitivity of the $i^{th}$ voxel, $G_i$, is the estimate of the amount of change of a specific data value in volts per ampere for a unit change in one of the parameters and is given by the equation:

$$G_i = \frac{\partial}{\partial P_i} V$$

Where V is the electrical potential in volts per ampere measured between electrodes and $P_i$ is the natural logarithm of the electrical conductivity of the $i^{th}$ voxel. For the following examples, each voxel is a 50×50×50 meter cube embedded in a 100 Ohm-meter half-space.

Figure 7:
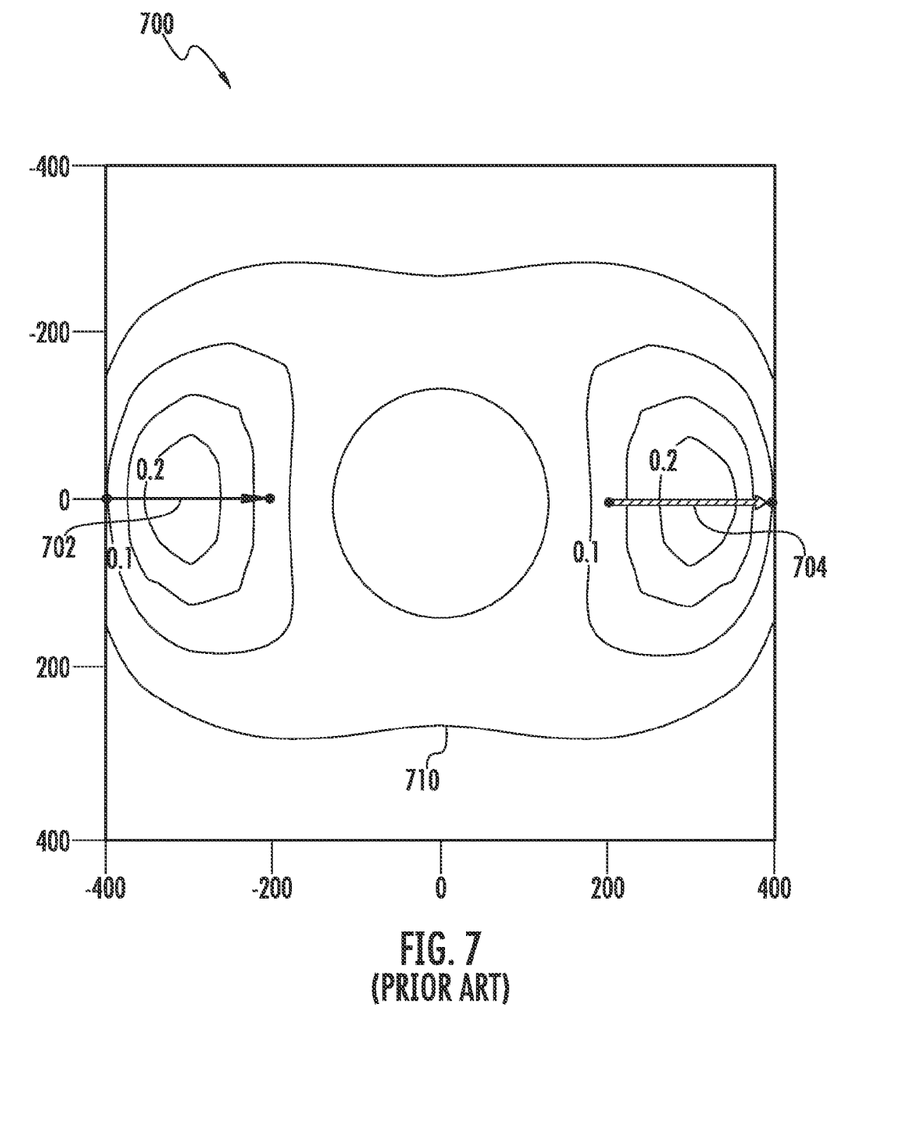
FIG. 7 is substantially a contour map of sensitivity for a prior art electrical geophysical technique (EGT) system.
Figure 8:
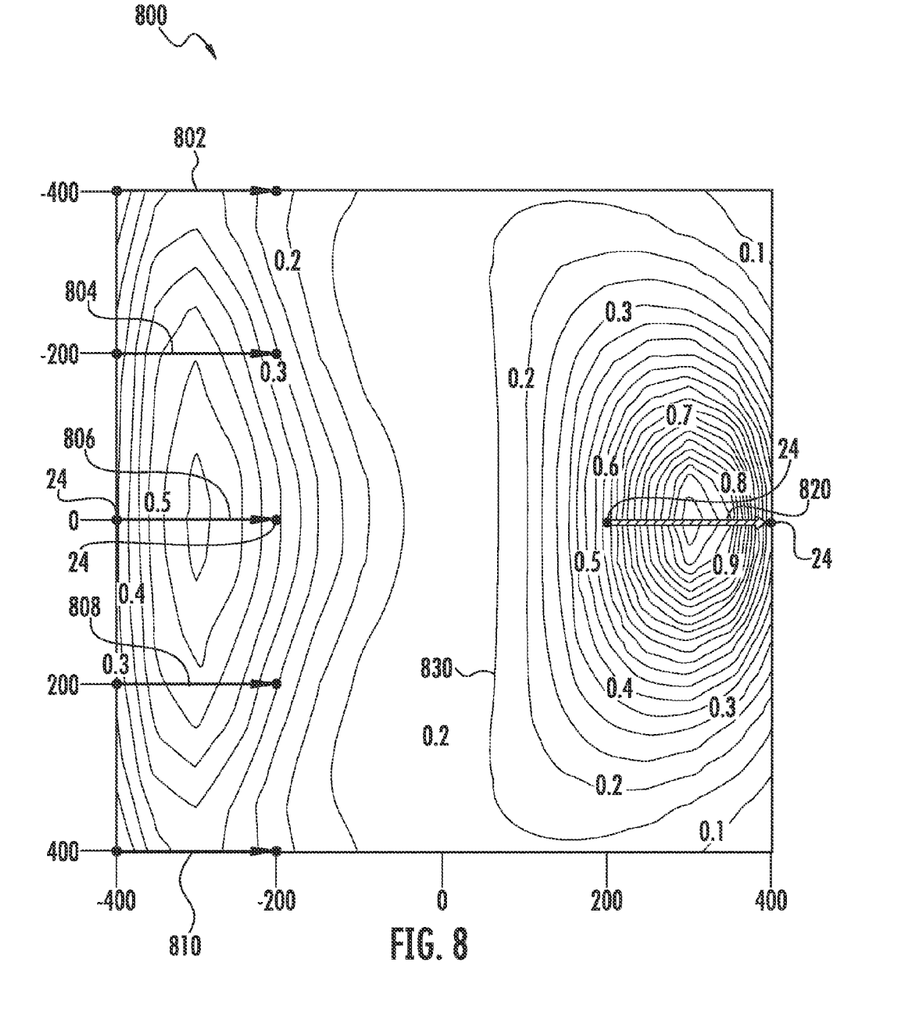
FIG. 8 is substantially a contour map of data sensitivity to voxels at a depth of 200 meters in accordance with one embodiment of the present invention.
Figure 9:
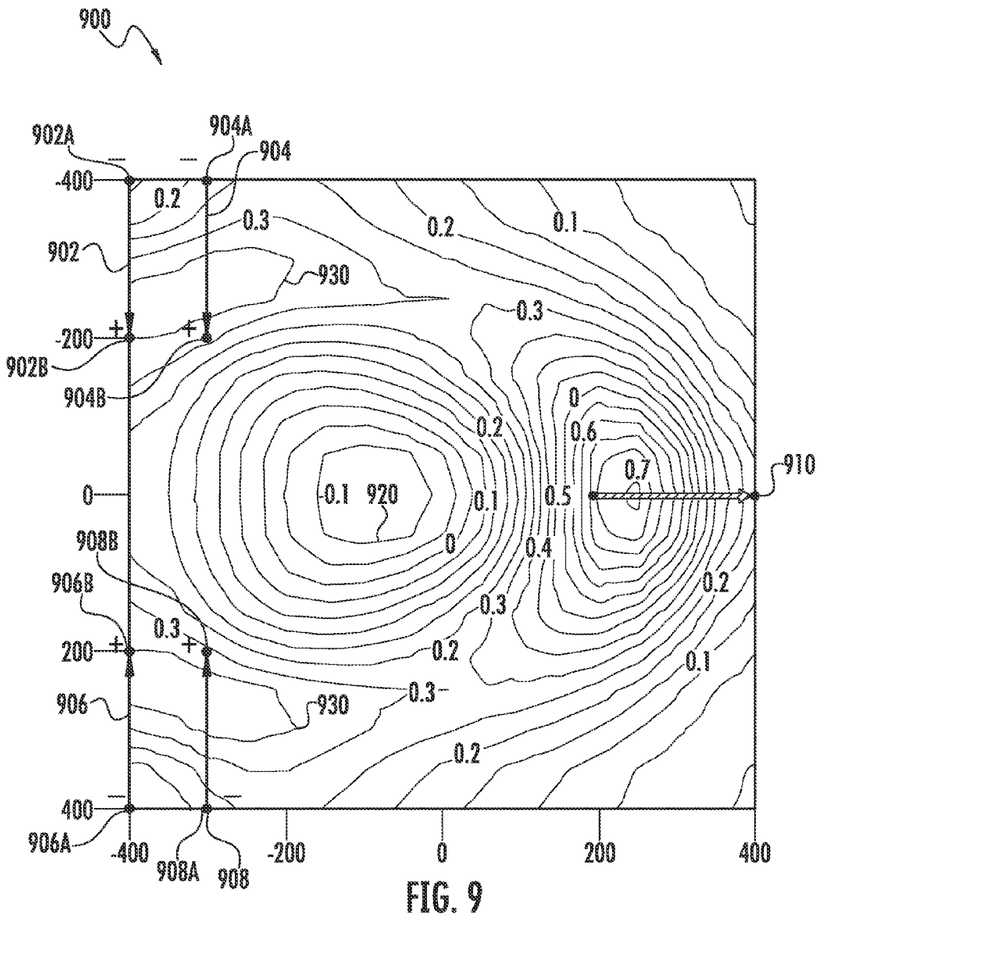
FIG. 9 is substantially a contour map of data sensitivity voxels at a depth of 200 meters in accordance with another embodiment of the present invention.

FIGS. 7, 8, and 9 illustrate the sensitivities for a series of voxels centered at a depth of 200 meters. The calculation of sensitivity values is given in references on electrical and electromagnetic modeling of geophysical data.

FIG. 7 shows a plot of sensitivity 700 with contours lines showing regions of equal sensitivity 710 for a dipole-dipole array of the prior art with a single transmitting dipole 702 and receiving dipole 704. The contour map of FIG. 7 is for the data sensitivity to voxels at a depth of 200 meters for a 200 meter transmitting dipole 702 and receiving dipole 704. The contour interval is 0.05 volts per amp. The sensitivity plots show a dumbbell shaped anomaly with the highest responses below the transmitting dipole 702 and receiving dipole 704. FIG. 7 shows the sensitivity pattern for a typical, non-multisource system for comparison with multi-source methods. The purpose of this invention is to increase the amplitude and create improved patterns of subsurface sensitivity.

Referring to FIG. 8, a plot of sensitivity 800 for one embodiment of the present invention is shown.

FIG. 8 illustrates an example with five parallel simultaneously transmitting dipoles 802, 804, 806 and 810 and a single receiving dipole 820. Each of dipoles 802-820 are formed by a pair of evenly-spaced electrodes 24. In one embodiment, each dipole can be formed by a pair of electrodes 24 that are connected to one transceiver 20. In another embodiment, a dipole can be formed by having one electrode 24 connected to one transceiver 20 and another electrode 24 connected to another transceiver 20. For example, with additional reference to FIG. 4, a dipole can be formed between the electrode 24 connected to connector 1006A of tranceiver 20E and the electrode 24 connected to connector 1006C of transceiver 20B. The transmitting of low-frequency electrical current uses two of the electrodes in transceiver array 200 as electrodes.

The contour map of FIG. 8 is the sensitivity of data to voxels at a depth of 200 meters with five parallel 200 meter-spaced transmitting dipoles 802-810 and a single receiving dipole 820. The contour interval is 0.05 volts per amp.

The shape of the contours or anomalies 830 show that the amplitude of the signal received has increased by almost a factor of five. Therefore, the sensitivity at depth shows a large increase when the number of transmitting dipoles is increased from one to five.

Referring to FIG. 9, a plot of sensitivity 900 for another embodiment of the present invention is shown. In FIG. 9, an example is shown with a configuration that uses four pairs of dipoles 902, 904, 906 and 908 with two pairs having opposing polarities and a single receiving dipole 910. The contour map of FIG. 9 is for data sensitivity to voxels at a depth of 200 meters with four opposed 200 meter-spaced transmitting dipoles 902-908 and a single receiving dipole 910. Note that the contour line or anomaly 920 roughly in the center of FIG. 9 has a negative value. The contour interval is 0.05 volts per amp.

Dipoles 902 and 904 can have negative electrodes 902A and 904A and positive electrodes 902B and 904B. Dipoles 906 and 908 can have negative electrodes 906A and 908A and positive electrodes 906B and 908B. The polarity of dipoles 902 and 904 is opposite the polarity of dipoles 906 and 908. The dipole configuration illustrated in FIG. 9 can have a strong response at depth; however, the polarity of the sensitivity values 930 are inverted below the transmitting dipoles 902-908. This change in the sensitivity patterns makes the combination of these two array patterns very sensitive to changes in subsurface resistivity below the current sources.

The embodiments of FIGS. 8 and 9 use dipoles that simultaneously transmit the same magnitude of current with the same timing/phase and use a single receiver. It is contemplated that embodiments of the present invention can use both arbitrary current flow values and the averaging of data from multiple receivers. In this case, the response of the system, V, is made from the weighted summation of several receivers given by the equation:

$$V = \sum_j a_j v_j$$

Where $v_j$ is the observed electrical potential for a single receiver and $a_j$ are weighting coefficients. The choice of the location, number of receivers and weighting coefficients $a_j$, and the choice of the number, location, and current strength of the transmitting dipoles will be designed according to the survey objectives and site conditions. Numerical modeling can be used to estimate the signal level to make certain that the signal-to-noise levels are sufficiently high in order to collect accurate data. In addition, sensitivity analysis can be used to estimate the detectability of specific targets. One measure of the detectability of the target is the normalized sensitivity $\hat{G}_i$ given by the equation:

$$\hat{G}_i = \frac{|G_i|^2}{\sum_{k \neq i} |G_k|^2}$$

where $G_k$ are the sensitivities of the voxels throughout the survey area. Large values of $\hat{G}_i$ indicate high sensitivity to a specific voxel or group of voxels.

The present invention can be used to collect resistivity data from a geological formation in which the frequency is low enough or the time period long enough to ignore electromagnetic coupling effects. Alternatively, the present invention can be used to collect low-frequency electromagnetic data. In this embodiment, the frequency of the primary waveform is high enough such that the maximum separation between the receiving and transmitting transceiver apparatuses is of the order of one skin depth and the frequency is low enough such that electrical conductivity dominates over dielectric effects.

The present invention may be used either for subsurface characterization using portable transceivers or may be used for long-term monitoring using permanently or semi-permanently placed transceivers with permanently placed electrodes.

This present invention allows for the measurement of subsurface electrical properties using a distributed system of low-power transceivers to perform large scale geological surveys. The distributed transceivers can transmit current simultaneously from a number of locations.

The present invention uses a modular system of transceivers that can collect data as independent stand-alone units or can be interconnected in a grid or matrix to allow flexible multi-dimensional data collection. Each transceiver can collect and process data in multiple waveform modes. These modes include time-domain, frequency domain or pseudo-random wave sequences.

The present invention contains multiple transmitters that are each capable of transmitting precisely controlled waveforms and multiple transceivers that can transmit simultaneously. The transceiver apparatuses or modules can communicate with each other through either a wired, fiber optic, or wireless radio frequency or infrared interface.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

I claim:

1. A system for measuring geological data, comprising:
a first transceiver having a housing, transmitter circuitry to generate an electrical current for injection into a subsurface area, receiver circuitry to measure at least one electrical signal, a power supply for providing power to the transmitter circuitry, and a communications module for communicating at least one of control or measurement data to a computing device;
a link socket, disposed on the housing, to mate with a cable from a second transceiver;
a first electrode socket, disposed on the housing, to mate with a cable of a first electrode;
a second electrode socket, disposed on the housing, to mate with a cable of a second electrode; and
a multiplexer, disposed in the housing and electrically coupled to the transmitter circuitry;
wherein:
the transmitter circuitry includes a current source contact and a current sink contact;
when the multiplexer is in a first configuration, the current sink contact is electrically coupled with the first electrode socket and the current source contact is electrically coupled with the second electrode socket such that the transmitter circuitry is arranged to inject current through the second electrode, when the second electrode is coupled to the second electrode socket, using power supplied by the power supply, and
when the multiplexer is in a second configuration, the current sink contact is electrically coupled with the first electrode socket and the current source contact is electrically coupled with the link socket such that the transmitter circuitry is arranged to inject current through the link socket, when the second transceiver is coupled to the link socket, using power supplied by the power supply.

2. The system of claim 1, wherein the first and second transceivers are in wireless communication with each other.

3. The system of claim 2, wherein the first transceiver has a processor and software is operable on the processor to process an electrical signal measured by the receiver circuitry.

4. The system of claim 1, wherein the transmitter circuitry is to generate electrical current in response to a communication signal received by the communications module via the second transceiver.

5. The system of claim 1, wherein the receiver circuitry is to measure an electrical signal in response to a communication signal received by the communications module via the second transceiver.

6. The system of claim 1, further comprising the second transceiver.

7. The system of claim 1, wherein:
when the multiplexer is in a third configuration, the current source contact is electrically coupled with the first electrode socket and the current sink contact is electrically coupled with the link socket such that the transmitter circuitry is arranged to sink current through the link socket, when the second transceiver is coupled to the link socket, using power supplied by the power supply.

8. The system of claim 1, wherein:
the receiver circuitry includes a first potential contact and a second potential contact;
when the multiplexer is in a third configuration, the first potential contact is electrically coupled with the first electrode socket and the second potential contact is electrically coupled with the second electrode socket; and
when the multiplexer is in a fourth configuration, the first potential contact is electrically coupled with the first electrode socket and the second potential contact is electrically coupled with the link socket.

9. The system of claim 1, wherein the link socket is a first link socket, and wherein the system further comprises:
a second link socket, disposed on the housing, to mate with a cable from a third transceiver;
wherein, when the multiplexer is in a third configuration, the current sink contact is electrically coupled with the first electrode socket and the current source contact is electrically coupled with the second link socket such that the transmitter circuitry is arranged to inject current through the second link socket, when the third transceiver is coupled to the second link socket, using power supplied by the power supply.

10. The system of claim 1, wherein:
the communications module is in communication with a remote computing device;
the remote computing device is in communication with a third transceiver;
in response to a control signal from the remote computing device received by the communications module, the transmitter circuitry is to generate electrical current for injection into the subsurface area such that the electrical current is injected into the subsurface area substantially simultaneously with the injection of electrical current into the subsurface area by the third transceiver; and
the third transceiver is to inject electrical current into the subsurface area in response to a control signal from the remote computing device.

11. The system of claim 10, wherein:
the power supply is a first power supply;
the third transceiver is to inject electrical current into the subsurface area using power from a second power supply included in a housing of the third transceiver; and
the second power supply is different from the first power supply.

12. The system of claim 1, wherein the power supply is a battery.

13. The system of claim 1, wherein the first and second transceivers use a common time reference.

14. The system of claim 13, wherein the common time reference is based on global positioning system signals.

* * * * *